(12) United States Patent
Asano et al.

(10) Patent No.: US 9,260,134 B2
(45) Date of Patent: Feb. 16, 2016

(54) VEHICLE-BODY FRONT STRUCTURE

(71) Applicant: MAZDA MOTOR CORPORATION, Hiroshima (JP)

(72) Inventors: Norio Asano, Hiroshima (JP); Shohei Yoshida, Hatsukaichi (JP); Fumitaka Andou, Hatsukaichi (JP); Hiroaki Takeshita, Aki-gun (JP); Ippei Kuroda, Hiroshima (JP); Shun Teshigahara, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/473,842

(22) Filed: Aug. 29, 2014

(65) Prior Publication Data

US 2015/0084375 A1   Mar. 26, 2015

(30) Foreign Application Priority Data

Sep. 20, 2013   (JP) ................................. 2013-194935

(51) Int. Cl.
   *B62D 21/11*   (2006.01)
   *B62D 25/08*   (2006.01)
(52) U.S. Cl.
   CPC .............. *B62D 21/11* (2013.01); *B62D 25/082* (2013.01)
(58) Field of Classification Search
   CPC ..... B62D 21/11; B62D 25/082; B62D 25/085
   USPC .................. 296/187.09, 187.08, 193.08, 204, 296/203.02; 280/784, 124.109
   See application file for complete search history.

(56) References Cited

U.S. PATENT DOCUMENTS

| | | | |
|---|---|---|---|
| 2014/0183833 A1* | 7/2014 | Takeshita et al. ...... | 280/124.109 |
| 2015/0083514 A1* | 3/2015 | Asano et al. .................. | 180/312 |
| 2015/0107932 A1* | 4/2015 | Gabbianelli et al. .......... | 180/312 |

FOREIGN PATENT DOCUMENTS

JP   2005-271811 A   10/2005

\* cited by examiner

*Primary Examiner* — Jason S Morrow
(74) *Attorney, Agent, or Firm* — Studebaker & Brackett PC

(57) ABSTRACT

A pair of right-and-left extension members which deform and absorb an impact at a vehicle frontal collision, in cooperation with a pair of front side frames, are provided. The extension members are configured to be joined to respective middle portions, in a height direction, of a pair of tower portions of a sub frame at their rear end portions, to project forward, bending outward at a level below the front side frames, and to be comprised of a pair of members having a closed cross section, respectively. The rear end portions of the extension members joined to the tower portions are positioned so that a center line of a longitudinal direction of each of the extension members at the rear end portion is located at an inward position relative to a center line of a standing-vertical direction of each of the tower portions.

6 Claims, 16 Drawing Sheets

VEHICLE-BODY FRONT STRUCTURE

BACKGROUND OF THE INVENTION

The present invention relates to a vehicle-body front structure, and specifically relates to a vehicle-body front structure which comprises front side frames extending in a vehicle longitudinal direction at right and left sides of an engine room, projecting forward from a vehicle-compartment portion, and a sub frame provided at a bottom portion of the engine room, the sub frame comprising a body portion which is comprised of right-and-left side portions and a front side portion and tower portions, the right-and-left side portions constituting attachment portions of lower arms of a front-wheel suspension, the front side portion interconnecting the right-and-left side portions in a vehicle width direction, the tower portions being provided to stand substantially vertically at right and left sides of the body portion and fastened to respective lower face portions of the front side frames at respective upper end portions thereof, the right-and-left side portions being fastened to a bottom portion forward of the vehicle-compartment portion at respective rear portions thereof.

Herein, the front side frames may not provide the resistance that is large enough against a collision load when a vehicle frontal collision occurs. Accordingly, a vehicle-body front structure, in which the sub frame is provided below the front side frames and therefore both the front side frames and the sub frame can receive the collision load so as to absorb collision energy, has been proposed recently.

A structure disclosed in Japanese Laid-Open Publication No. 2005-271811 is known as an example of the above-described vehicle-body front structure. That is, a sub frame is provided below front side frames, this sub frame extends forward from a floor frame jointly-fixed to a lower face of a floor panel, and a front end of the sub frame is located at a specified level below the front side frames. Herein, this sub frame is configured such that a bending portion is formed at a middle portion, in a longitudinal direction, of the sub frame so that a front portion of the sub frame forward of this bending portion rises sharply. Therefore, there is a problem in that when the vehicle frontal collision occurs, the above-described bending portion may deform downward, so that improper buckling may happen to the sub frame.

Herein, a structure shown in FIG. 16 as a comparative example may be considered in order to solve the above-described problem. That is, as shown in this figure, this structure comprises front side frames 100 which extend in a vehicle longitudinal direction at right and left sides of an engine room (FIG. 16 shows a right-side part only), projecting forward from a vehicle-compartment portion and a sub frame 105 which is provided at a bottom portion of the engine room, the sub frame 105 comprising a body portion 103 which is comprised of right-and-left side portions 101 and a front side portion 102 and tower portions 104, the right-and-left side portions 101 constituting attachment portions of lower arms of a front-wheel suspension, the front side portion 102 interconnecting the right-and-left side portions 101 in a vehicle width direction, the tower portions 104 being provided to stand substantially vertically at right and left sides of the body portion 103 and fastened to respective lower face portions of the front side frames 100 at their respective upper end portions 104a, the right-and-left side portions 101 being fastened to a bottom portion (not illustrated) forward of the vehicle-compartment portion at their respective rear portions.

Further, an extension member 106 is welded to a middle portion, in a vertical direction, of a pole portion 104b of the above-described tower portion 104 at its base portion, and this extension member 106 is configured to extend forward from the pole portion 104b and have a bending portion for inward-bending 106a which bends inward, in the vehicle width direction, only at its longitudinally-middle portion. According to this structure, when the vehicle frontal collision occurs, the front side frame 100 and the extension member 106 may jointly receive the vehicle-frontal collision load, so that the extension member 106 may bend inward, in the vehicle width direction, as shown by imaginary lines in FIG. 16.

In this comparative example shown in FIG. 16, however, there is a problem in that when the collision load is inputted, the stress may concentrate at the base portion (a so-called root portion) of the extension member 106 and consequently the welding portion may be apart, so that the extension member 106 may get broken at its base portion as shown by the imaginary lines in FIG. 16.

SUMMARY OF THE INVENTION

Accordingly, an object of the present invention is to provide a vehicle-body front structure, in which the front side frame and the extension member can jointly receive the vehicle-frontal collision load and also the extension member can bend inward surely regardless of a collision manner, without getting broken at its base portion.

According to the present invention, there is provided a vehicle-body front structure, comprising a pair of right-and-left front side frames extending in a vehicle longitudinal direction at right and left sides of an engine room, projecting forward from a vehicle-compartment portion, a sub frame provided at a bottom portion of the engine room, the sub frame comprising a body portion which is comprised of right-and-left side portions and a front side portion and a pair of right-and-left tower portions, the right-and-left side portions constituting right-and-left attachment portions of right-and-left lower arms of a front-wheel suspension, the front side portion interconnecting the right-and-left side portions in a vehicle width direction, the pair of tower portions of the sub frame being provided to stand substantially vertically at right and left sides of the body portion and fastened to respective lower face portions of the pair of front side frames at respective upper end portions thereof, the right-and-left side portions of the body portion of the sub frame being fastened to a bottom portion forward of the vehicle-compartment portion at respective rear portions thereof, and a pair of right-and-left extension members operative to deform and absorb an impact at a vehicle frontal collision, in cooperation with the pair of front side frames, wherein the pair of extension members are configured to be joined to respective middle portions, in a height direction, of the pair of tower portions of the sub frame at respective rear end portions thereof, to project forward, bending outward, in the vehicle width direction, at a level below the pair of front side frames, and to be comprised of a pair of members having a closed cross section, respectively, and the respective rear end portions of the pair of extension members joined to the pair of tower portions of the sub frame are positioned so that a center line of a longitudinal direction of each of the pair of extension members at the rear end portion is located at an inward, in the vehicle width direction, position relative to a center line of a standing-vertical direction of each of the pair of tower portions of the sub frame.

According to the present invention, since the rear end portion of the extension member is joined to the middle portion, in the height direction, of the tower portion of the sub frame and the extension member projects forward, bending outward, in the vehicle width direction, at the level below the front side frame, the front side frame and the extension member can jointly deform and absorb the impact at the vehicle frontal collision.

Further, since the center line of the longitudinal direction of the extension member at the rear end portion is located at the inward, in the vehicle width direction, position relative to the center line of the standing-vertical direction of the tower portion of the sub frame, the tower portion is twisted when the vehicle-frontal collision load is inputted, which causes the extension member to bend inward, in the vehicle width direction, at its front portion which projects forward from its rear end portion, not to get broken at its rear end portion (i.e., the root portion). That is, twisting of the tower portion can surely cause inward-bending of the front portion of the extension member regardless of the collision manner.

According to an embodiment of the present invention, the tower portion of the sub frame has a portion having a U-shaped cross section which opens outward, in the vehicle width direction, which is provided for storing a pivot of the lower arm, and the rear end portion of the extension member has a cut-out portion at an outward side, in the vehicle width direction, thereof and connecting of the rear end portion of the extension member to the tower potion is configured such that the cut-out portion of the extension member is made contact and welded to both a front-side portion and an inward-side portion of the portion having the U-shaped cross section of the tower portion. Thereby, the length of the welding line can be properly long, so that it can be surely prevented that the extension member gets broken at the rear end portion, thereby ensuring the above-described inward-bending of the extension member.

According to another embodiment of the present invention, a pedestal for supporting a stabilizer is provided forward of the upper end portion of the tower portion at a level which overlaps the extension member, and the extension member is configured such that a center line thereof extends forward from the rear end portion, curving inward, in the vehicle width direction, once so as to avoid the pedestal for supporting the stabilizer and then curving outward, in the vehicle width direction. Thereby, the stabilizer and the extension member can be properly arranged together, and the above-described effect of the inward-bending of the extension member can be enhanced.

According to another embodiment of the present invention, the closed cross section of the extension member is configured such that the size thereof is great at the rear end portion of the extension member and becomes narrow toward the above-described portion which curves inward so as to avoid the pedestal for supporting the stabilizer. Thereby, the above-described inward-bending of the extension member at the vehicle frontal collision can be promoted.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
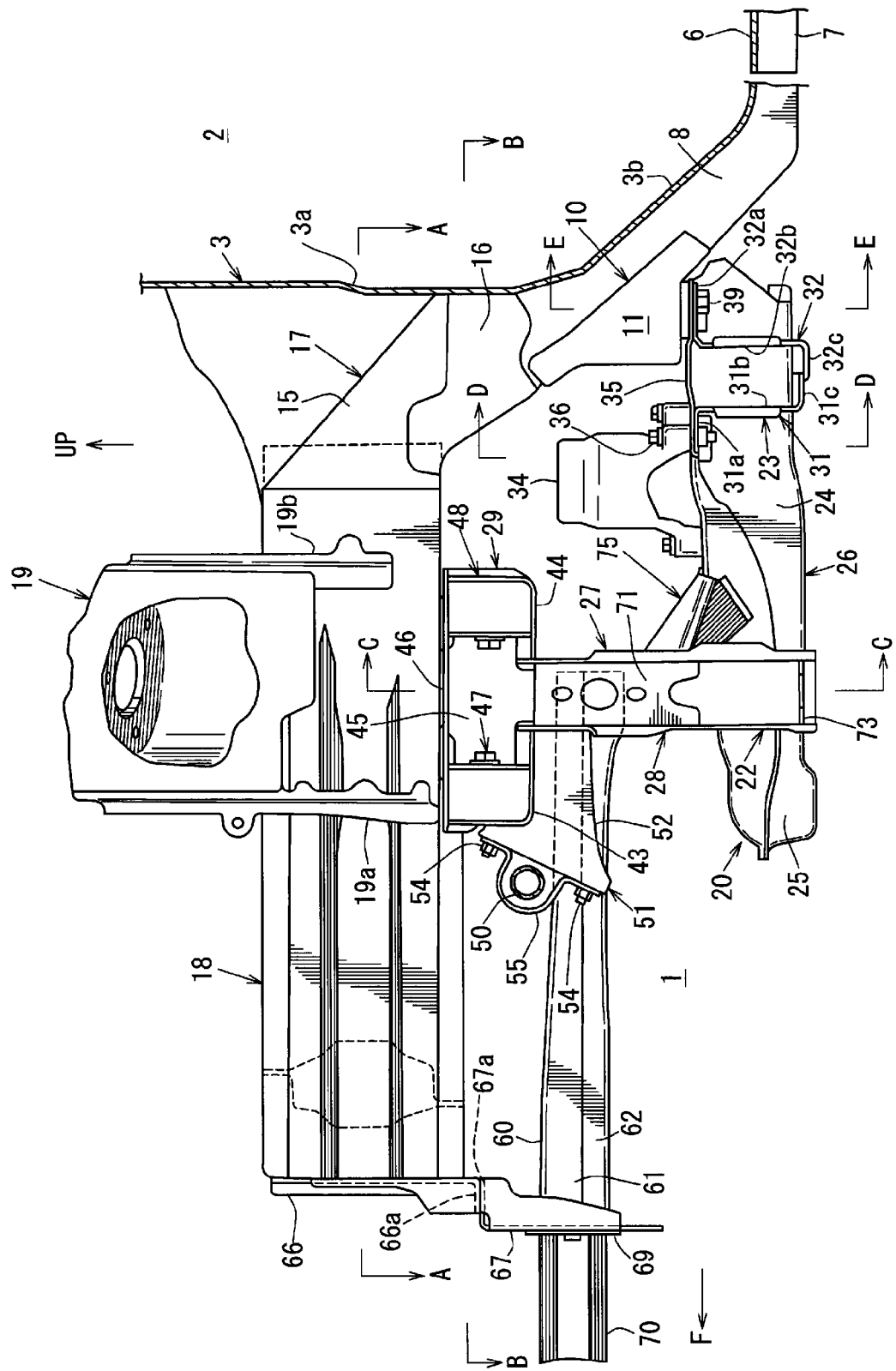
FIG. 1 is a side view showing a vehicle-body front structure of the present invention.
Figure 2:
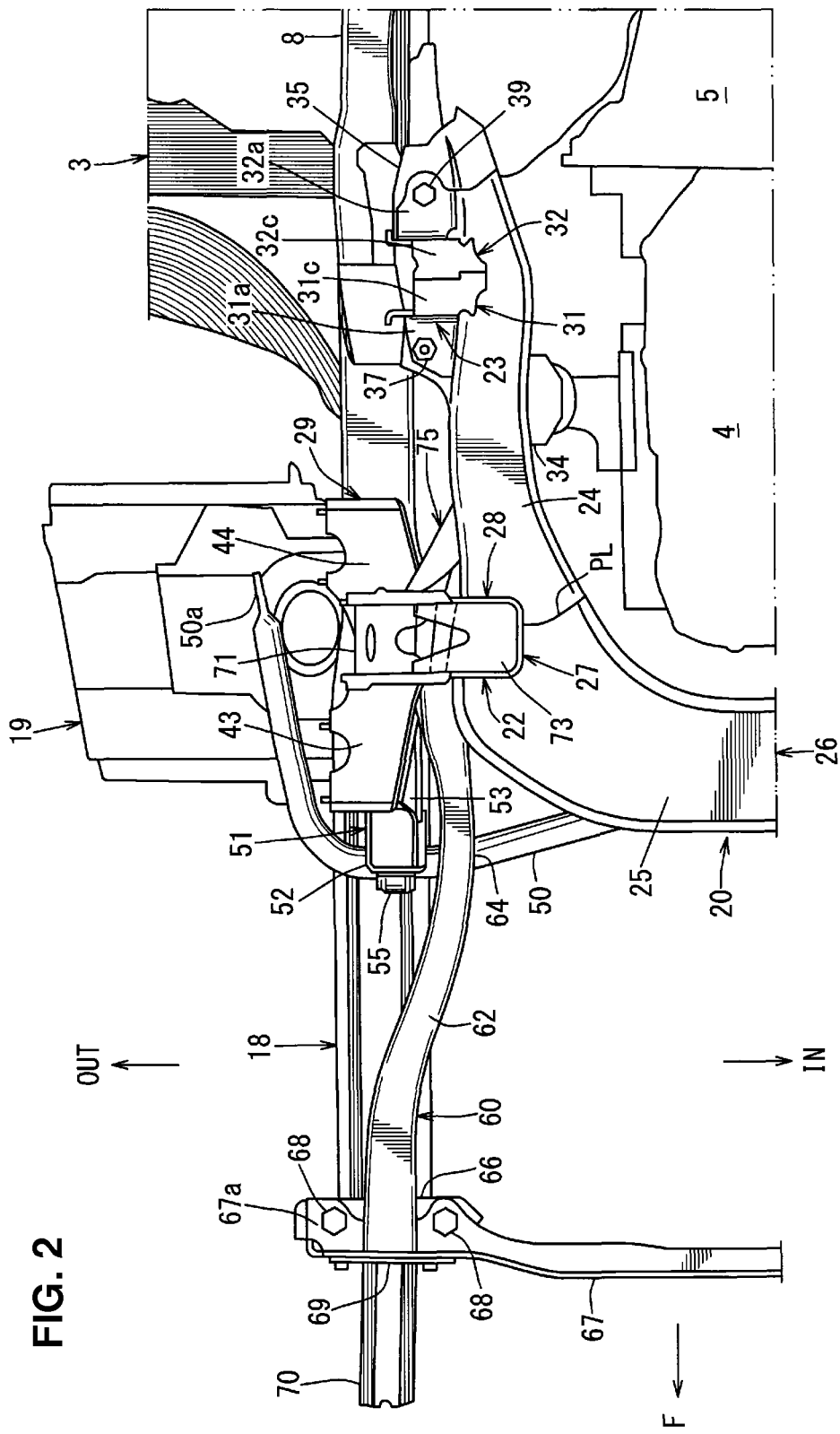
FIG. 2 is a bottom view showing the vehicle-body front structure.
Figure 3:
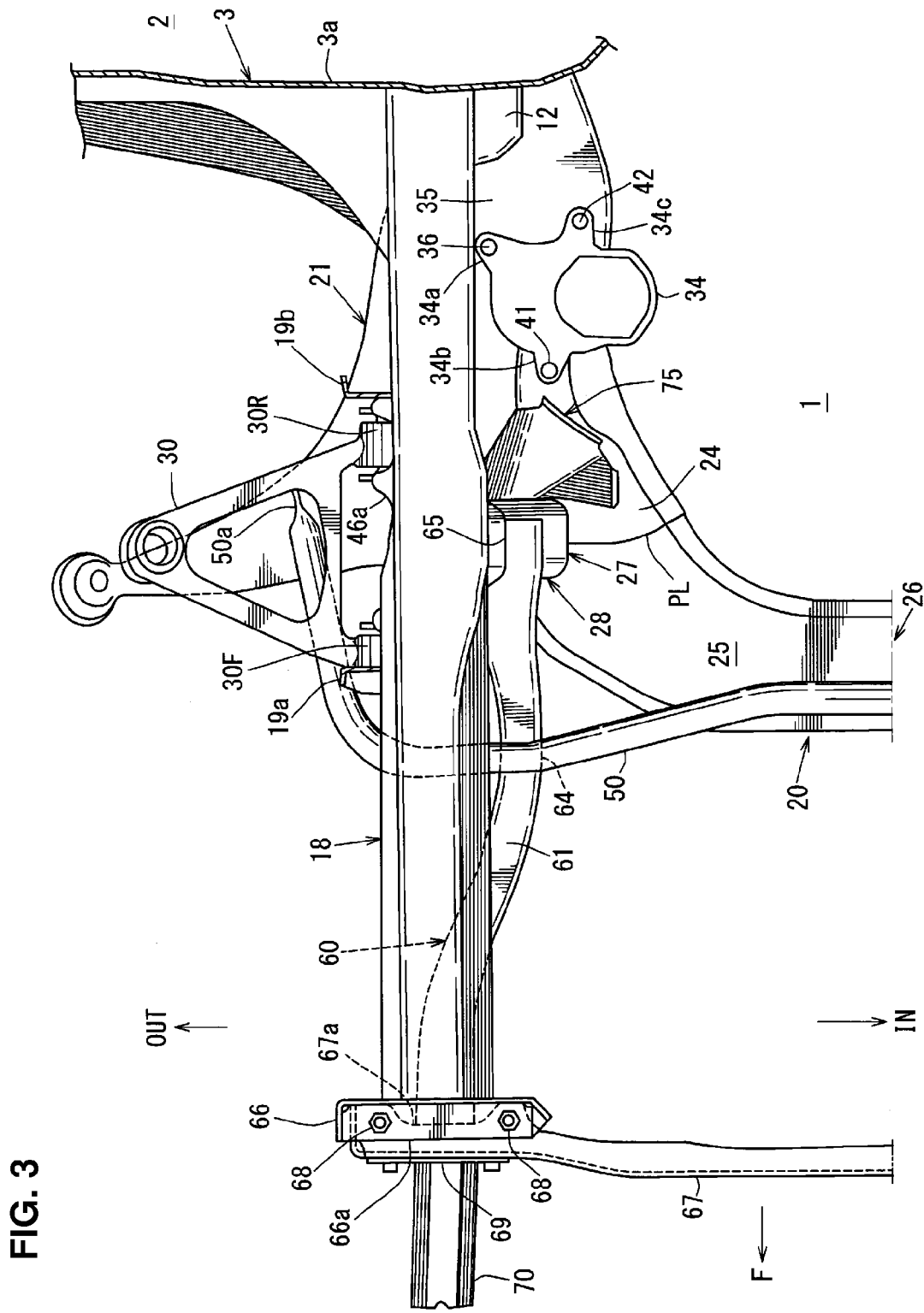
FIG. 3 is a plan view of a vehicle-right side, when viewed from line A-A of FIG. 1.
Figure 4:
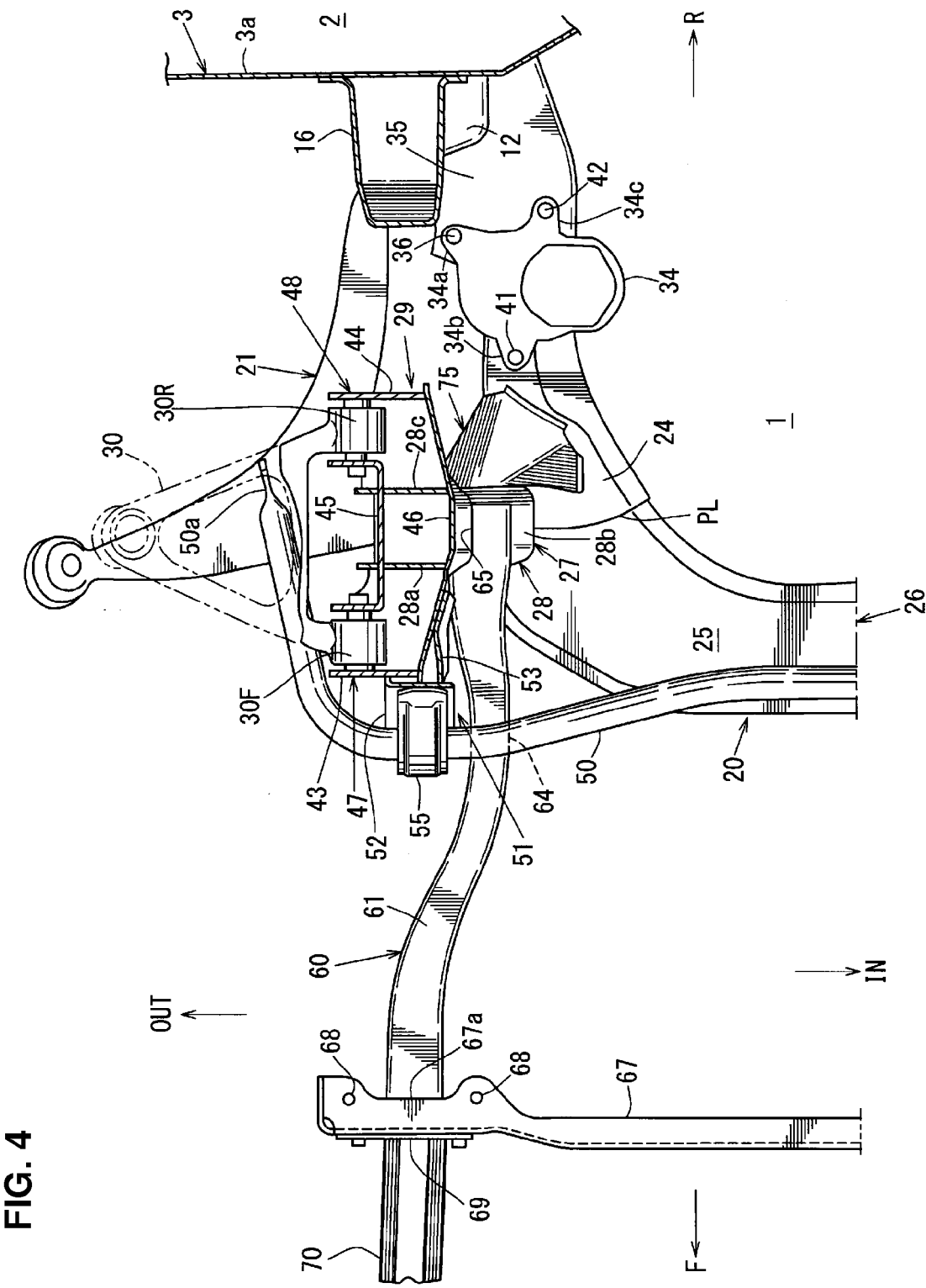
FIG. 4 is a plan view of the vehicle-right side, when viewed from line B-B of FIG. 1.
Figure 5:
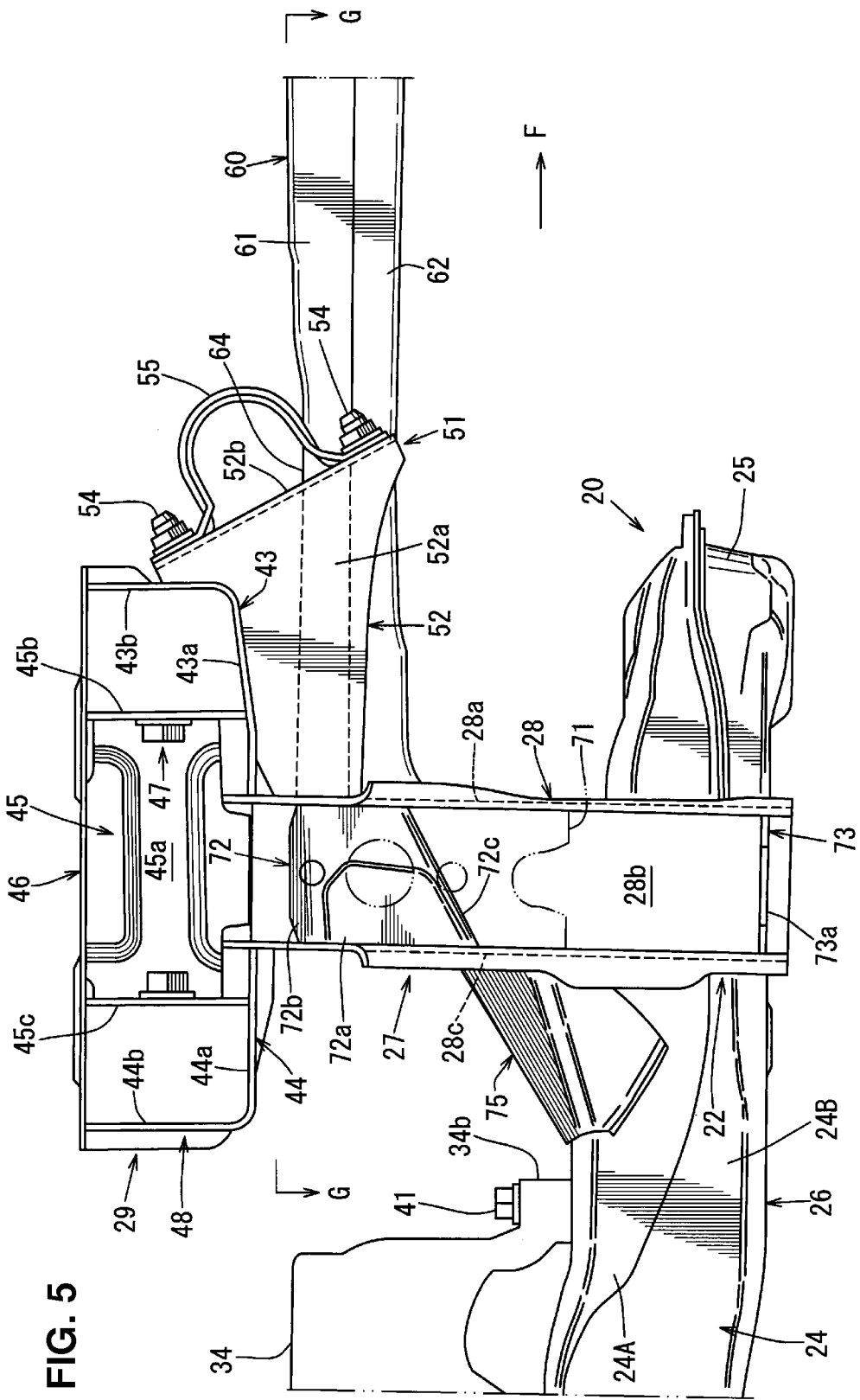
FIG. 5 is a major-part enlarged side view of the vehicle-right side.

The figures show a vehicle-body front structure. FIG. 1 is a side view showing constitution of a vehicle-left side of the vehicle-body front structure, FIG. 2 is its bottom view, FIG. 3 is a plan view of a vehicle-right side, when viewed from line A-A of FIG. 1, FIG. 4 is a plan view of the vehicle-right side, when viewed from line B-B of FIG. 1, and FIG. 5 is a major-part enlarged side view of the vehicle-right side. The vehicle-body front structure of the present embodiment is configured substantially symmetrically around a vehicle-center line.

In FIGS. 1-5, a dash lower panel 3 (dash panel) which partitions an engine room 1 and a vehicle compartment 2 in a vehicle longitudinal direction is provided. As shown in FIG. 2, the present embodiment uses a front-engine rear-drive type of vehicle. In the engine room 1, an engine 4 is arranged longitudinally, a transmission 5 is connected to a rear portion of the engine 4, and this transmission 5 is arranged below a floor tunnel portion.

As shown in FIG. 1, the above-described dash lower panel 3 comprises a vertical wall portion 3a which extends vertically and a slant portion 3b which slants downward and rearward from a lower portion of the vertical wall portion 3a, and a floor panel 6 is provided continuously from a lower end of the slant portion 3b. A floor frame 7 is jointly fixed to a lower face portion of the floor panel 6 so as to form a closed cross section extending in a vehicle longitudinal direction between the floor frame 7 and the floor panel 6. Thereby, the rigidity of a vehicle-body lower portion is increased.

Figure 14:
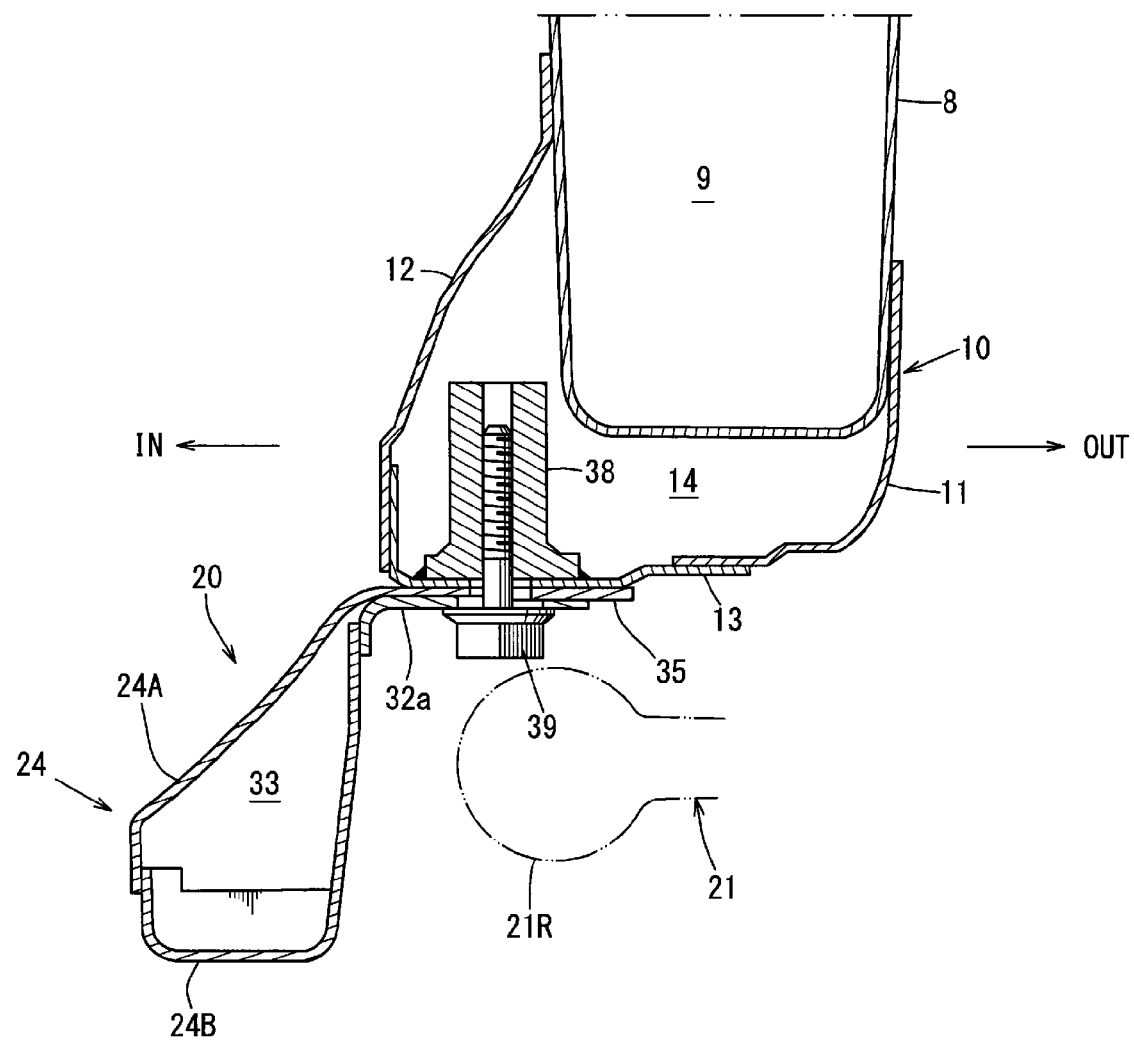
FIG. 14 is a major-part enlarged sectional view taken along line E-E of FIG. 1.

Further, a kick-up portion frame 8 is jointly fixed to a front lower portion of the slant portion 3b of the dash lower panel 3 so as to form a closed cross section 9 (see FIG. 14) between the kick-up portion frame 8 and the dash lower panel 3. A sub-frame attaching pedestal 10 is jointly fixed to a front-lower portion of the kick-up portion frame 8. This sub-frame attaching pedestal 10 comprises, as shown in FIG. 14, an attaching pedestal outer 11, an attaching pedestal inner 12, and an attaching pedestal lower 13. As shown in this figure, a closed cross section 14 is formed between the sub-frame attaching pedestal 10 and the kick-up portion frame 8.

Also, as shown in FIG. 1, a fillet member 17 which is comprised of two members of an upper-side fillet 15 and a lower-side fillet 16 is attached to a front portion of the vertical wall portion 3a of the dash lower panel 3. There are further provided a pair of front side frames 18 which extend in the vehicle longitudinal direction at right and left sides of the engine room 1, projecting forward straightly from the vertical wall portion 3a of the dash lower panel 3 via the fillet member 17. This front side frame 18 is a vehicle-body strengthening member having a longitudinally-extending closed cross section which is formed by a front side frame inner and a front side frame outer which are jointly fixed together. In the present embodiment, the front side frame 18 is formed in a cross cylindrical shape.

As shown in FIGS. 1-3, the front side frame 18, the kick-up portion frame 8, and the floor frame 7 are configured to extend straightly in a plan view. Moreover, as shown in FIGS. 1 and 2, a suspension tower portion 19 is provided at an outward side, in a vehicle width direction, of a longitudinally-middle portion of the front side frame 18 via front and rear leg portions 19a, 19b.

As shown in FIGS. 1-5, a sub frame 20 which is located at a bottom portion of the engine room 1 is provided. This sub frame 20 comprises a body portion 26 which is comprised of right-and-left side portions 24 and a front side portion 25 and a pair of right-and-left tower portions 27. Each of the right-and-left side portions 24 constitutes attachment portions 22, 23 of a lower arm 21 (see FIGS. 3 and 4) of a front-wheel suspension (a wishbone type of suspension), and the front side portion 25 interconnects the right-and-left side portions 24 in the vehicle width direction. As shown in FIG. 1, the pair of tower portions 27 are provided to stand substantially vertically at right and left sides of the body portion 26, respective upper end portions of which are fastened, with fastening members, not illustrated, to respective lower face portions of the pair of front side frames 18 at respective positions which correspond to the suspension tower portions 19. Respective rear portions of the right-and-left side portions 24 are fastened to the respective sub-frame attaching pedestals 10 (see FIG. 14) which are a bottom portion forward of the vehicle-compartment portion. Herein, each of the above-described tower portions 27 comprises a pole portion 28 which extends vertically and a tower top portion 29 which extends longitudinally at an upper end of the pole portion 28 and constitutes an attachment portion of an upper arm 30 (see FIGS. 3 and 4) of the front-wheel suspension.

Figure 6:
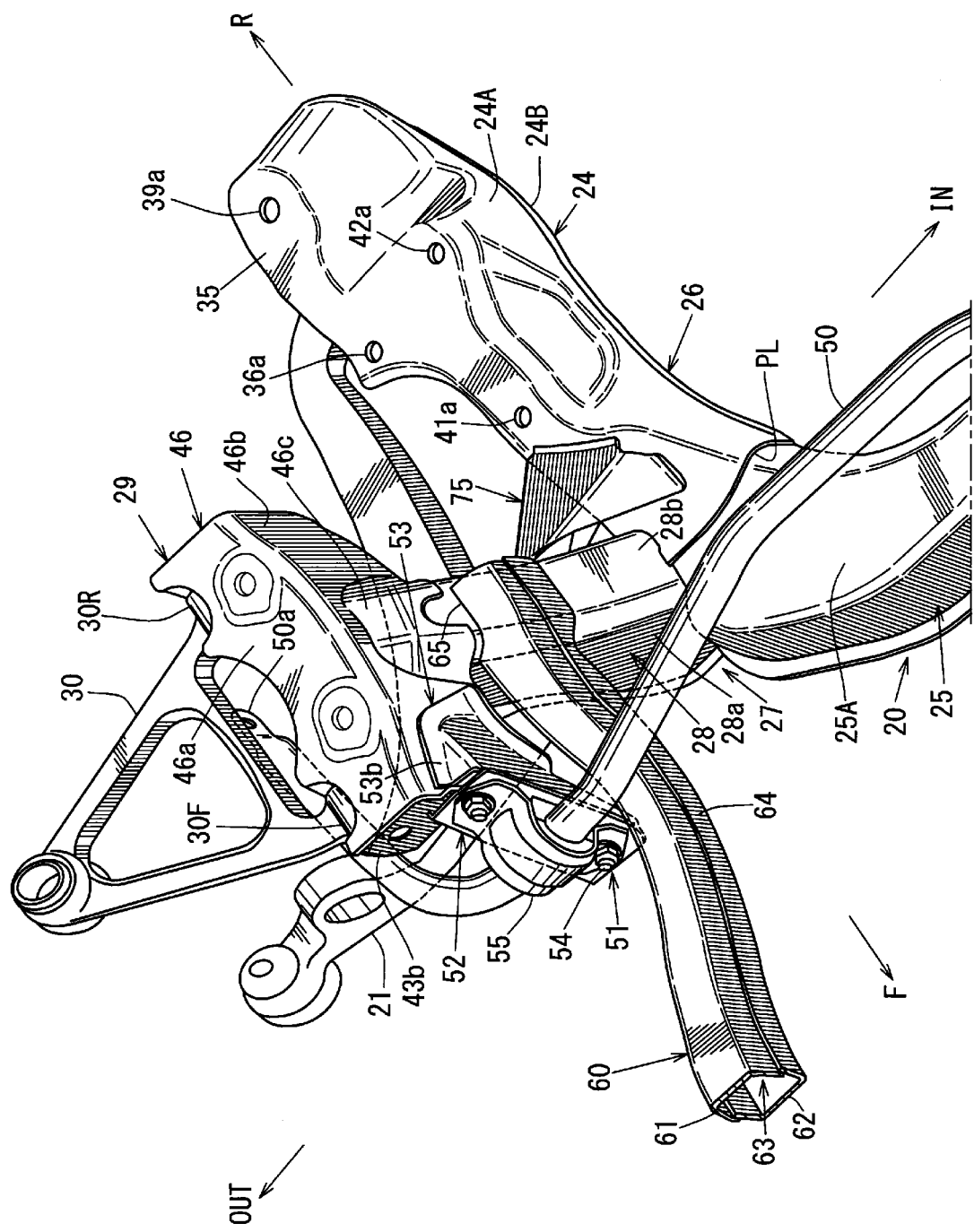
FIG. 6 is a perspective view of the vehicle-body front structure, when viewed obliquely from left, front and above.
Figure 7:
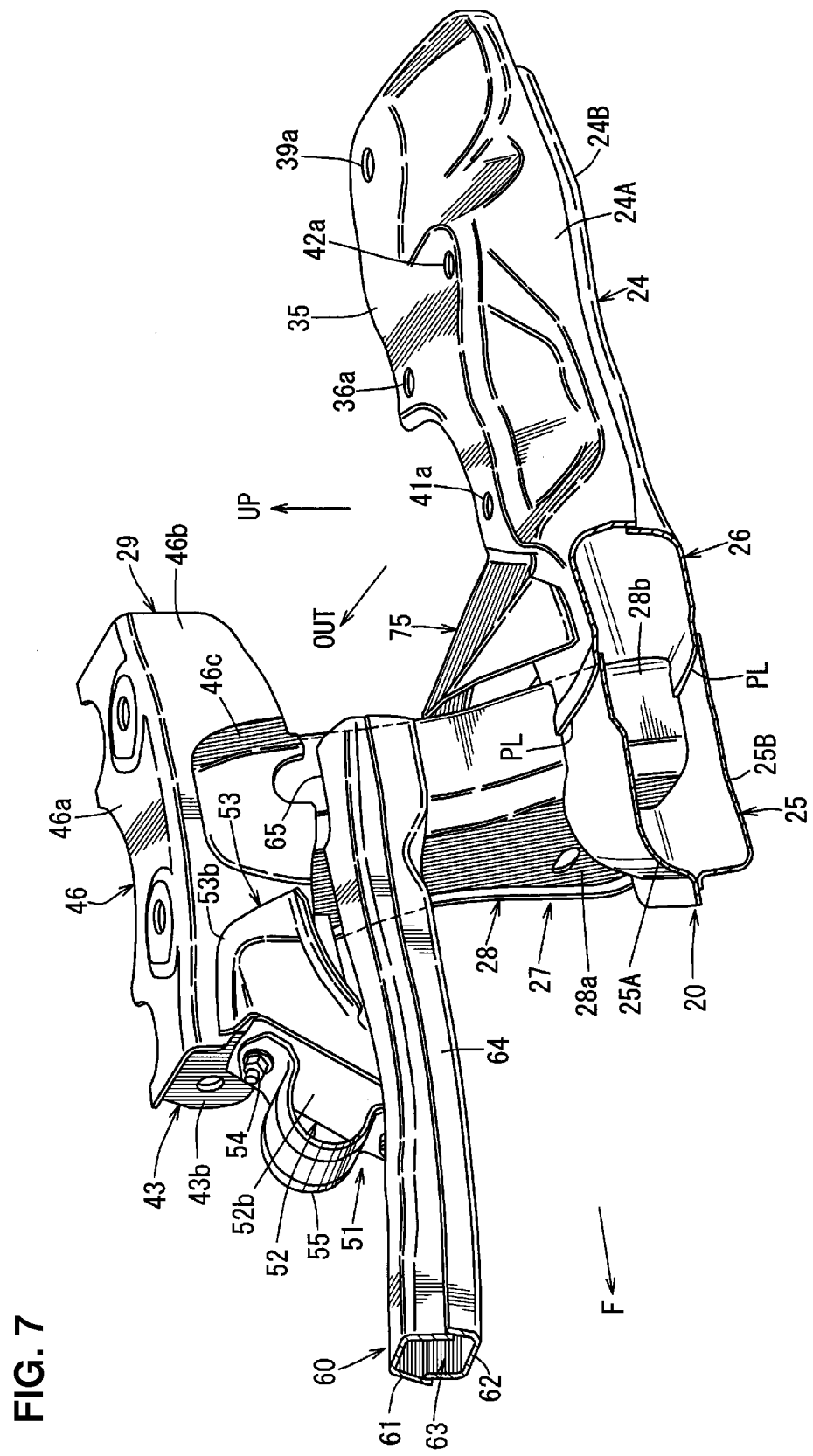
FIG. 7 is a perspective view of the vehicle-body front structure, when viewed obliquely from left and front.

FIGS. 6-9 are perspective views of the vehicle-body front structure, when viewed from different angles from each other. As shown in FIG. 7 particularly, each of the side portions 20 of the sub frame 20 is formed in a hollow shape, which is comprised of an upper-side member 24A and a lower-side member 24B. Likewise, the front side portion 25 of the sub frame 20 is formed in a hollow shape, which is comprised of an upper-side member 25A and a lower-side member 25B.

Figure 8:
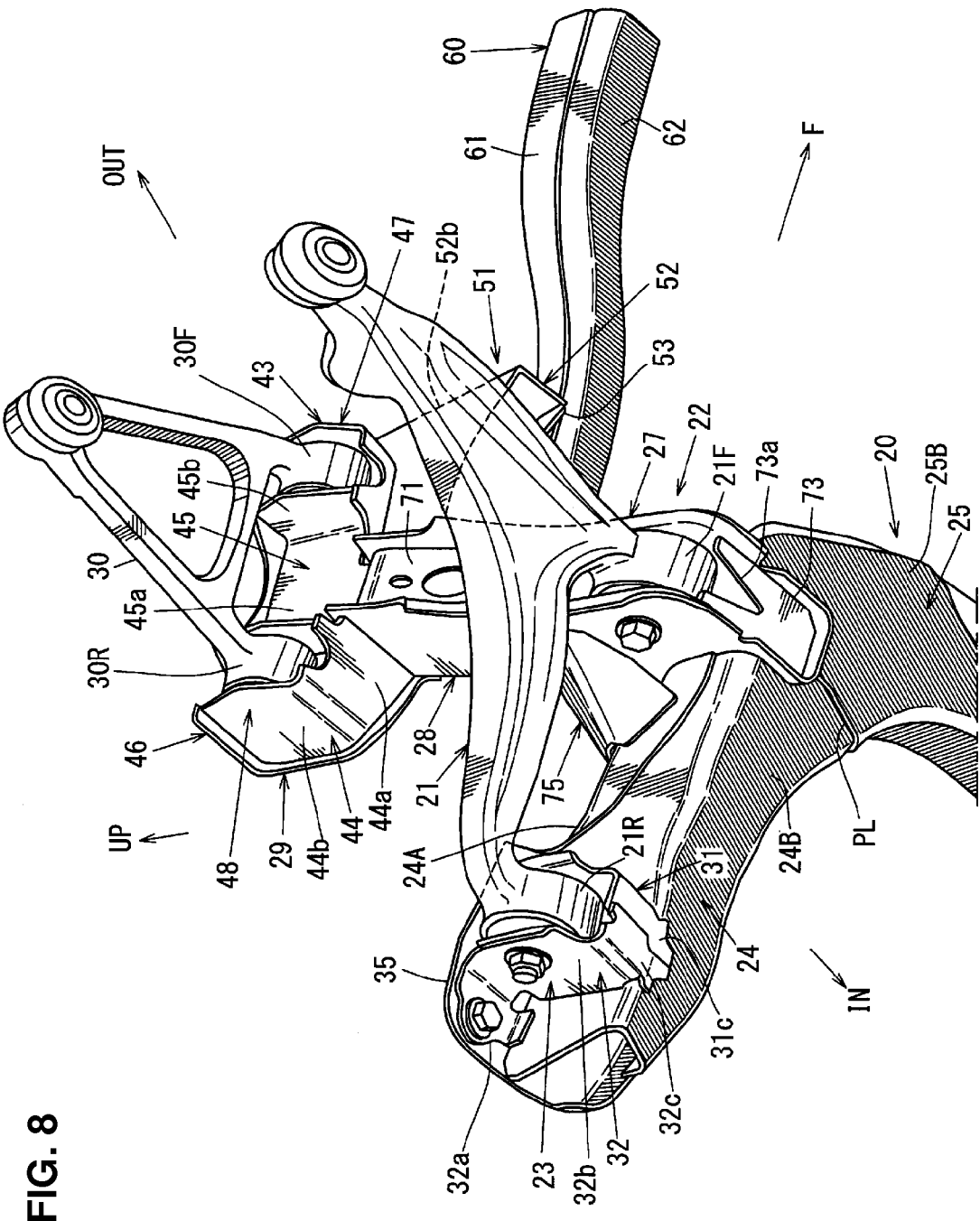
FIG. 8 is a perspective view of the vehicle-body front structure, when viewed obliquely from right, rear and below.
Figure 9:
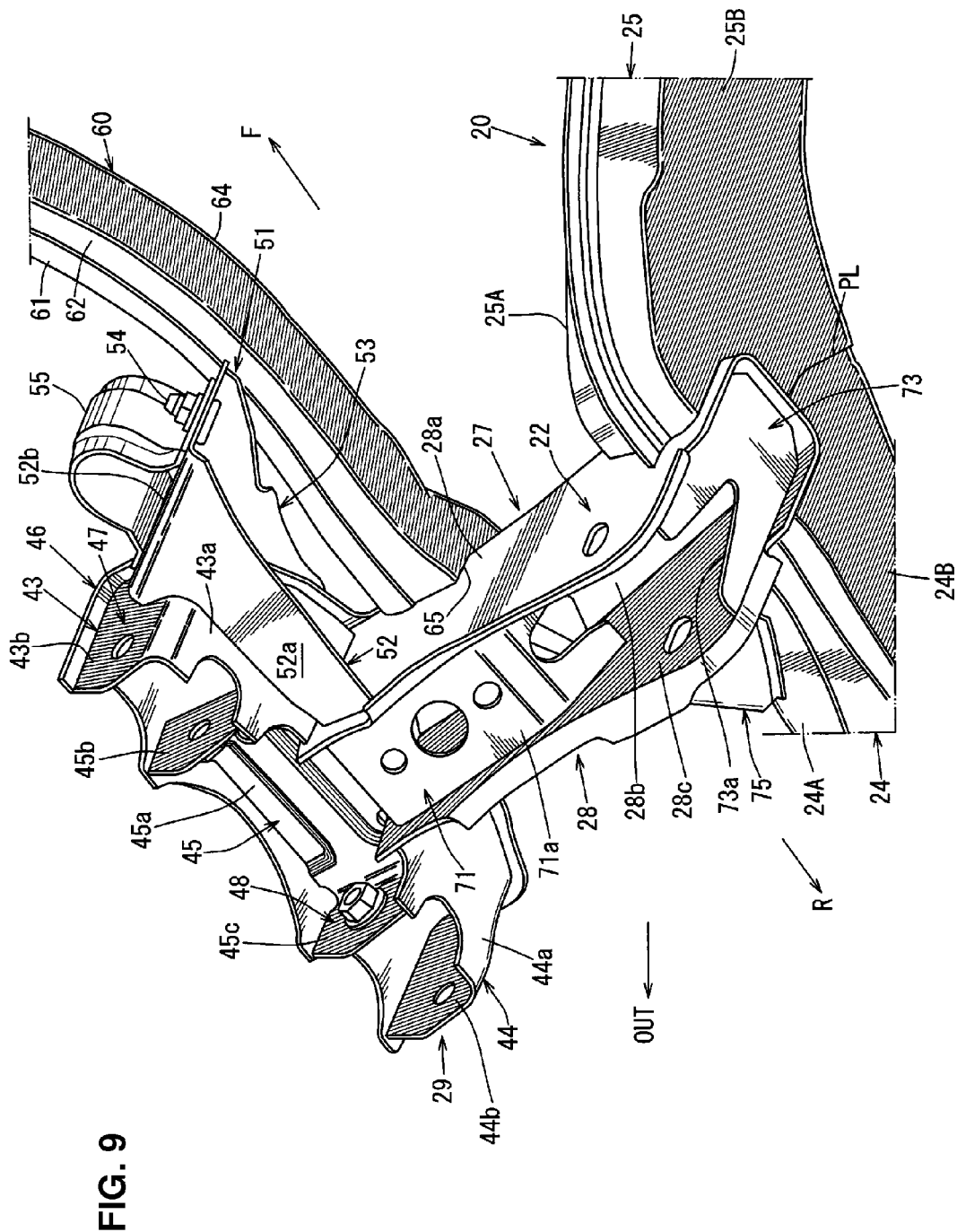
FIG. 9 is a perspective view of the vehicle-body front structure, when viewed obliquely from right, front and below.

Further, as shown in FIGS. 8 and 9, a split line PL between the side portion 24 and the front side portion 25 is formed at a position corresponding to the attachment portion 22 of the lower arm 21 so that the sub frame 20 can be surely crushed at the attachment portion 22 at the vehicle frontal collision, thereby increasing energy absorption of the impact.

Figure 10:
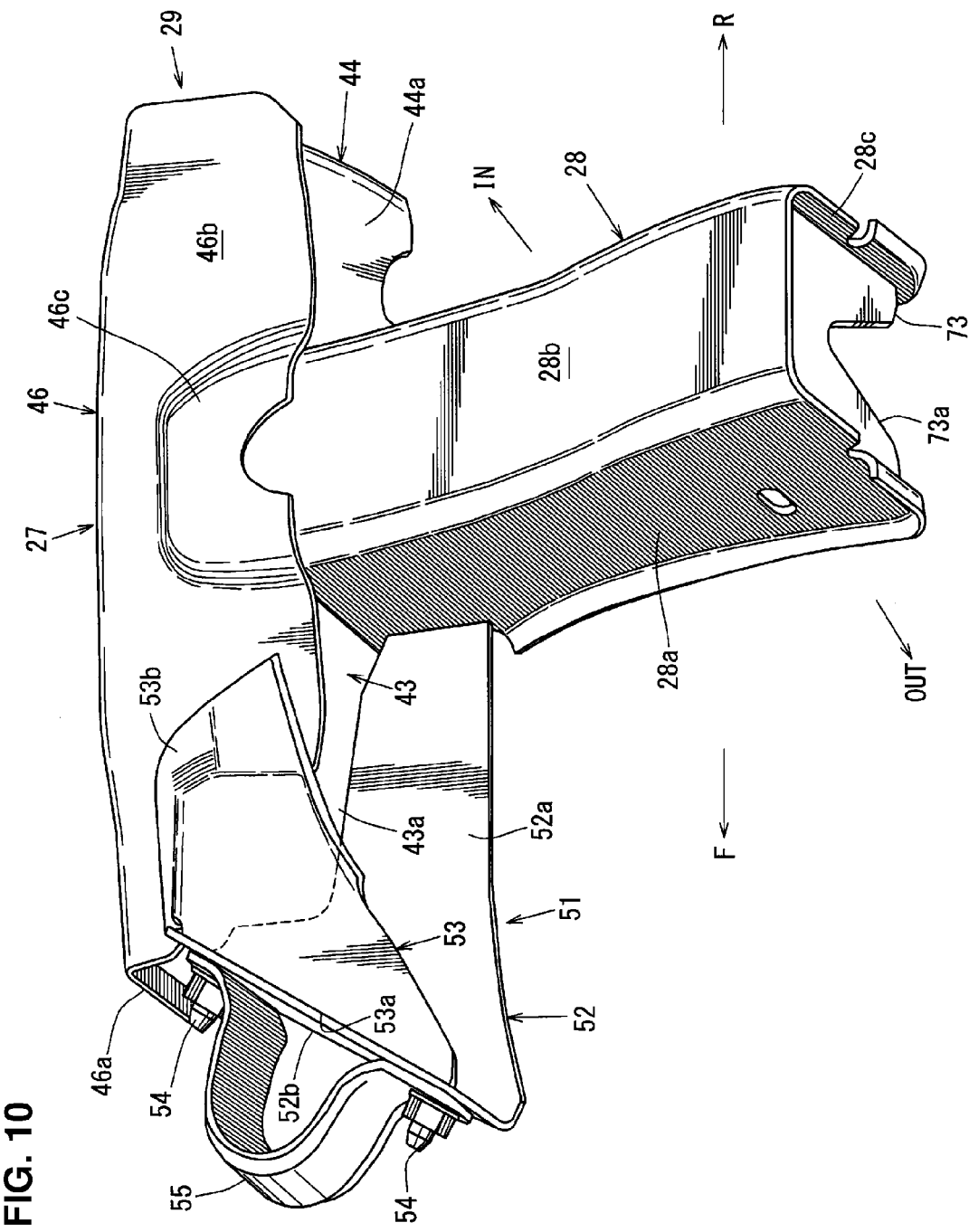
FIG. 10 is a perspective view showing structures of a tower portion and a pedestal for supporting a stabilizer.
Figure 11:
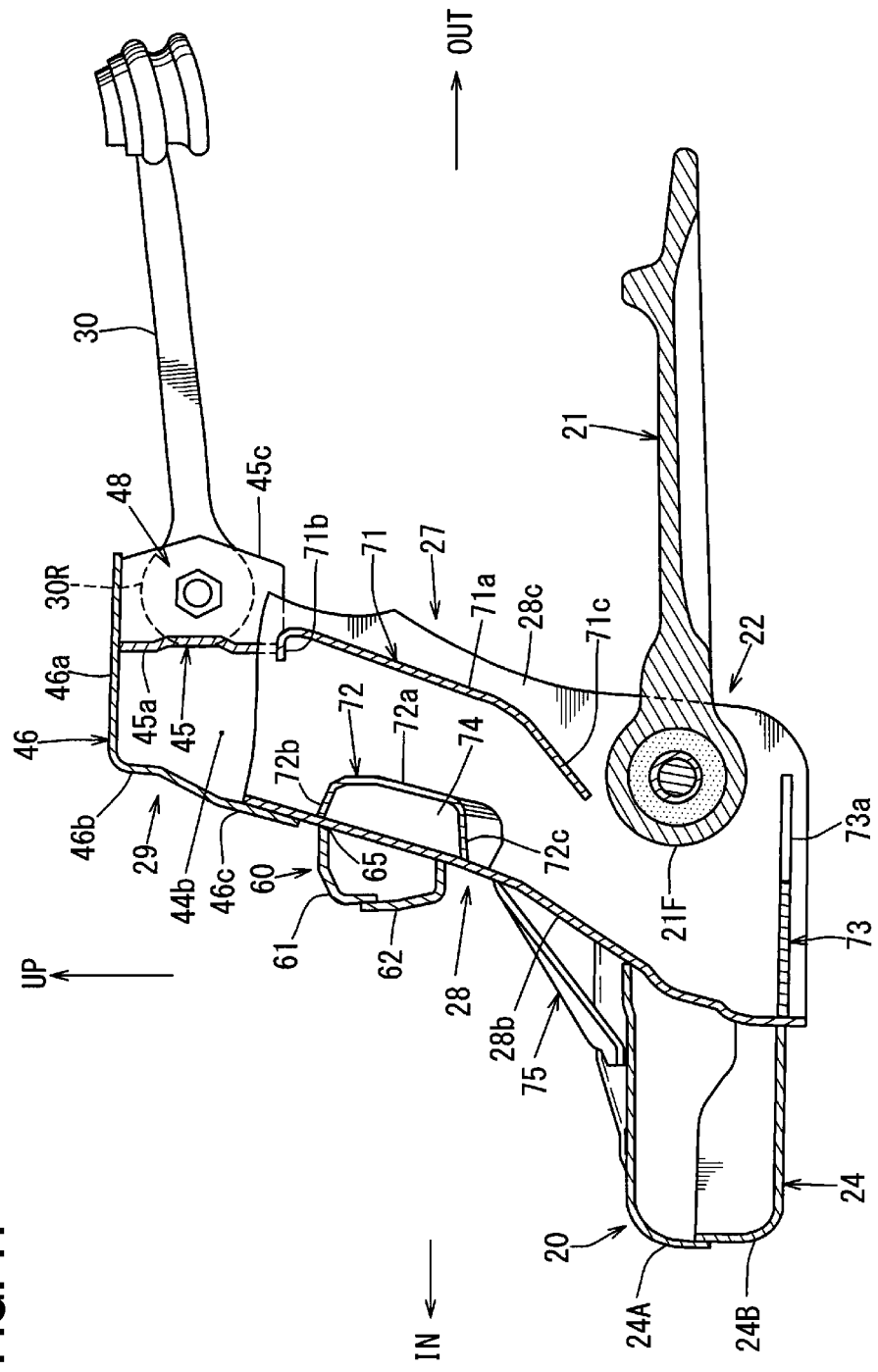
FIG. 11 is a sectional view taken along line C-C of FIG. 1.
Figure 12:
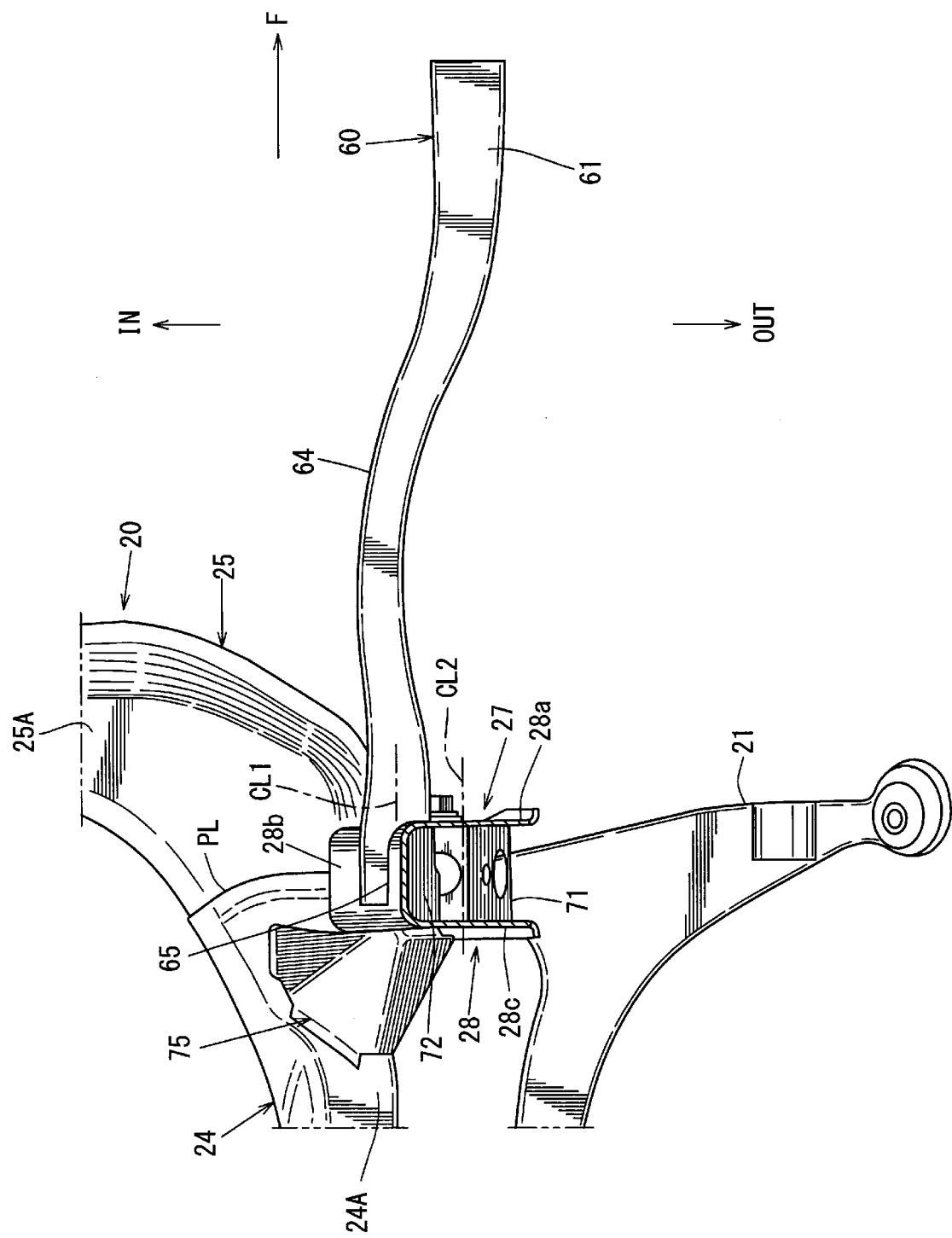
FIG. 12 is a plan view taken along line G-G of FIG. 5.
Figure 13:
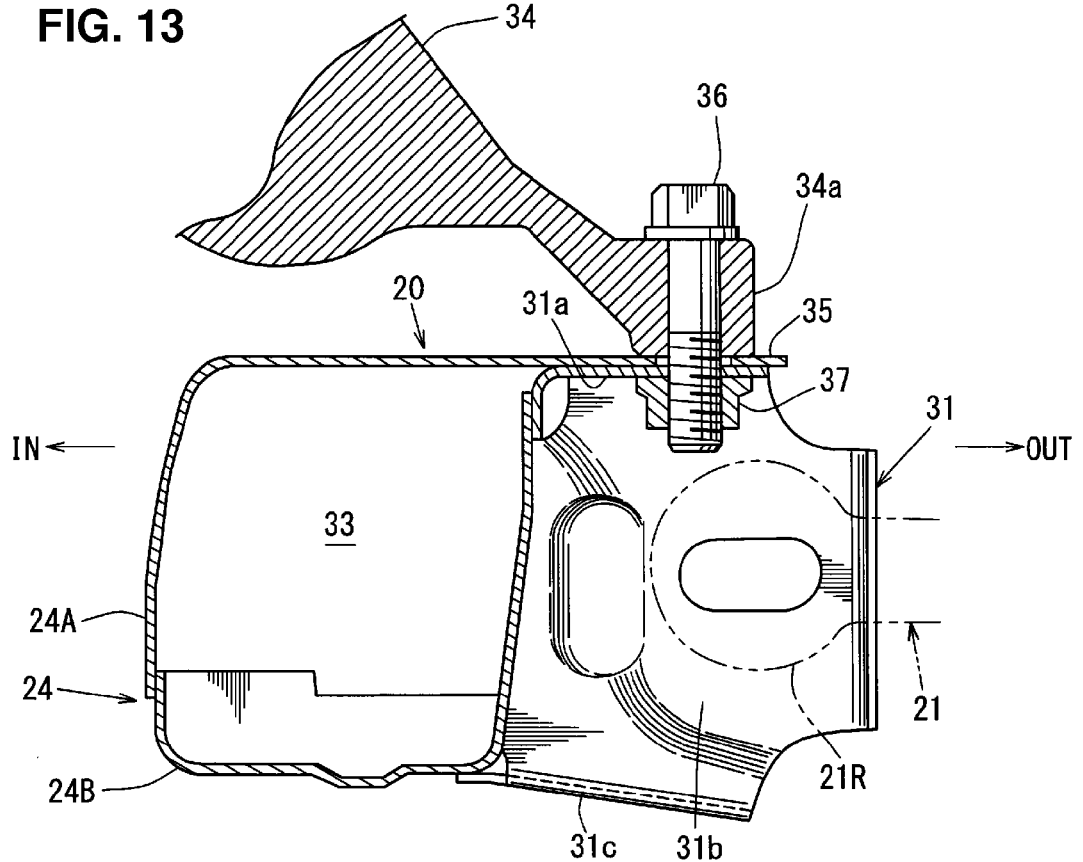
FIG. 13 is a major-part enlarged sectional view taken along line D-D of FIG. 1.

FIG. 10 is a perspective view showing structures of a tower portion and a pedestal for supporting a stabilizer, FIG. 11 is a sectional view taken along line C-C of FIG. 1, FIG. 12 is a plan view taken along line G-G of FIG. 5, FIG. 13 is a major-part enlarged sectional view taken along line D-D of FIG. 1, and FIG. 14 is a major-part enlarged sectional view taken along line E-E of FIG. 1.

The lower arm 21 has, as shown in FIG. 8, lower-arm pivots 21F, 21R at an inward side, in the vehicle width direction, thereof. The front-side lower-arm pivot 21F is pivoted at the attachment portion 22, and the rear-side lower-arm pivot 21R is pivoted at the attachment portion 23. The attachment portion 23 for the rear-side lower-arm pivot 21R is constituted by two brackets 31, 32 which are formed substantially in a Z shape in a side view as shown in FIGS. 1 and 2.

Herein, an outward portion, in the vehicle width direction, of the side portion 24 of the sub frame 20 is configured to extend substantially straightly in the vehicle longitudinal direction, a closed cross section 33 (see FIGS. 13 and 14) which is formed by the upper-side member 24A and the lower-side member 24B of the side portion 24 is configured to become smaller from a position attaching an engine mount 34 toward a position at its rear end, and a rear portion of the side portion 24 which is located rearward of the attachment position of the engine mount 34 is configured, as shown in FIGS. 13 and 14, such that a peak portion (eaves) 35 is formed by the upper-side member 24A only so as to extend outward, in the vehicle width direction, and opens downward. The above-described brackets 31, 32 comprises upper wall portions 31a, 32a, vertical wall portions 31b, 32b, and lower wall portions 31c, 32c. The upper wall portions 31a, 32a of the respective brackets 31, 32 are fixedly fastened to a lower face portion of the peak portion 35.

Herein, as shown in FIG. 13, the upper wall portion 31a of the front-side bracket 31 is fastened jointly with an attachment leg portion 34a which is one of plural attachment leg portions 34a, 34b, 34c (see FIGS. 3 and 4) of the engine mount 34 with a fastening member, such as a bolt 36 and nut 37. As shown in FIG. 14, the upper wall portion 32a of the rear-side bracket 32 is fastened, with a long bolt 39 inserted from below, to a sleeve nut 38 which has been previously fixedly welded to the closed cross section 14 of the attaching pedestal lower 13 of the sub-frame attaching pedestal 10, jointly with the peak portion 35 and the attaching pedestal lower 13.

The engine mount 34 comprises the plural attachment leg portions 34a, 34b, 34c as shown in FIGS. 3 and 4, and the other attachment leg portions 34b, 34c are fixedly fastened to the side portion 24 of the sub frame 20 with fastening members 41, 42 as shown in the same figures. Bolt through holes 36a, 39a of the above-described bolts 36, 39 and fastening-member through holes 41a, 42a of the above-described fastening members 41, 42 are shown in FIGS. 6 and 7.

The closed cross section 33 of the side portion 24 of the sub frame 20 and the brackets 31, 32 constituting the attachment portion 23 of the lower arm 21 are arranged side by side in the vehicle width direction as shown in FIGS. 13 and 14. Thereby, both increasing of the sub-frame rigidity by means of the closed cross section 33 and ensuring of a connection space of the brackets 31, 32 can be attained within a limited width, in the vehicle width direction, of the side portion 24 of the sub frame 20.

Moreover, as shown in FIG. 13, the leg portion 34a of the engine mount 34 and the upper wall portion 31a of the bracket 31 are jointly fastened to the peak portion 35 of the side portion 24 of the sub frame 20. Thereby, both ensuring of a connection space of the bracket 31 and reducing of the number of fastening members by means of joint fastening can be attained within a limited longitudinal length of the side portion 24 having a relatively short longitudinal length.

Herein, the above-described tower portion 27 comprising the pole portion 28 provided to stand at the side portion 24 of the sub frame 20 and the tower top portion 29 is configured as shown in FIGS. 5, 7, 9 and 10. That is, the above-described pole portion 28 is configured such that a U-shaped section opening outward for storing the front-side lower-arm pivot 21F of the lower arm 21 is formed by a front side portion 28a, an inward-side portion 28b, and a rear side portion 28c, and the above-described attachment portion 22 of a lower arm 21 is constituted by the U-shaped cross section of a lower portion of the pole portion 28. In other words, the lower portion of the pole portion 28 functions as a lower-arm front bracket.

The tower top portion 29 comprises, as shown in FIGS. 5, 7, 9 and 10, a front member 43 formed in an L shape in a side view, a rear member 44 formed in an L shape in the side view, a center member 45 formed in a U shape opening outward in a plan view, and a sheet of upper member 46 which forms an upper wall and an inward side wall of the tower top portion 29.

As shown in FIGS. 5 and 9, the above-described front member 43 is formed integrally in the L shape in the side view by a lower wall portion 43a and a front wall portion 43b, and the above-described rear member 44 is formed integrally in the L shape in the side view by a lower wall portion 44a and a rear wall portion 44b. Further, as shown in FIGS. 5 and 9, the above-described enter member 45 is formed integrally in the U shape in the plan view by a front wall portion 45b and a rear wall portion 45c which project outward, in the vehicle width direction, from front and rear sides of a side wall portion 45a which is positioned on the inward side.

As shown in FIG. 8, the upper arm 30 of the front-wheel suspension has upper-arm pivots 30F, 30R at an inward side, in the vehicle width direction, thereof. A pivot support portion 47 which pivots the front-side upper-arm pivot 30F is constituted by the above-described front wall portions 43b, 45b, and a pivot support portion 48 which pivots the rear-side upper-arm pivot 30R is constituted by the above-described rear wall portions 45c, 44b.

Further, as shown in FIGS. 7 and 9, the above-described upper member 46 is formed integrally by an upper wall portion 46a, a side wall portion 46b, and a protrusion portion 46c. Herein, the upper wall portion 46a is positioned at the upper end of the tower top portion 29. The side wall portion 46b extends downward from an inward side of the upper wall portion 46a. The protrusion portion 46c protrudes inward, in the vehicle width direction, corresponding to the contour of the pole portion 28, at a central portion, in the longitudinal direction, of the side wall portion 46b.

Meanwhile, as shown in FIGS. 2, 3, 4 and 6, there is provided a stabilizer 50 having a torsional rigidity operative to restrain the vehicle from rolling improperly greatly when the vehicle's one-side (right-side or left-side) wheels go up (bump) or go down (rebound). This stabilizer 50 extends in the vehicle width direction, and each of its both end portions 50a is attached to an upper portion of an outward end portion of the lower arm 21 via a control link, not illustrated.

As shown in FIG. 2, the stabilizer 50 is supported at the tower portion 27 at the level which corresponds to the front side frame 18. Accordingly, the support structure of the stabilizer 50 will be described referring to FIGS. 5-10. A pedestal 51 for supporting the stabilizer 50 is provided forward of the upper end portion of the tower portion 27 and at the level which overlaps, in a vertical direction, an extension member 60 which will be described later. This stabilizer-support pedestal 51 is comprised of an outside pedestal 52 which is located on its outward side and an inside pedestal 53 which is located on its inward side, which are fixedly welded to each other.

As shown in FIGS. 9 and 10, the outside pedestal 52 extends longitudinally, and comprises a side portion 52a having a front end portion which is configured to be wider than the other part and a pedestal face portion 52b which is formed by being integrally bent inward from a front end of the side portion 52a. The pedestal face portion 52b is configured to slant forward and downward.

Herein, as shown in FIGS. 5, 9 and 10, the side portion 52a of the outside pedestal 52 is fixedly welded to a front face of the front wall portion 43b and the lower wall portion 43a of the front member 43 of the tower top portion 29, and also to the front side portion 28a of the pole portion 28. Further, a stabilizer support member 55 is attached to the pedestal face portion 52b of the outside pedestal 52 by means of attaching members 54, 54, such as bolt and nut, so that a specified position of the stabilizer 50 which is located near the end portion of the stabilizer 50 is supported by the stabilizer support member 55.

The above-described inside pedestal 53 is, as shown in FIG. 10, fixedly welded to a back face of the pedestal face portion 52b of the outside pedestal 52 at its front end portion 53a which is configured to slant forward and downward, and also fixedly welded to the side wall portion 46b of the upper member 46 of the tower top portion 29 at its flange portion 53b which is configured to be continuous from an upper end portion of the inside pedestal 53 to a rear end portion of the inside pedestal 53. That is, the above-described stabilizer-support pedestal 51 is joined between the pivot support portion 47 for the upper arm 30 and the pole portion 28 of the tower portion 27 of the sub frame 20 so that the rigidity of the tower portion 27 can be increased.

As shown in FIGS. 5, 6 and 7, there are provided a pair of right-and-left extension members 60 which extend forward from respective middle portions, in a height direction, of the tower portions 27 of the sub frame 20. This extension member 60 is, as shown in FIGS. 6 and 7, a member having a closed cross section 63 extending substantially in the vehicle longitudinal direction, which is comprised of an upper member 61 having a U-shaped cross section opening downward and a lower member 62 having a U-shaped cross opening upward which are jointly fixed to each other.

Specifically, the above-described extension member 60 is connected to the pole portion 28 by welding at its rear end portion, and extends forward below the front side frame 18. The extension member 60 projects forward from its rear end portion in such a manner that its center line bends inward, in the vehicle width direction, first so as to avoid the stabilizer support pedestal 51, and then bends outward, in the vehicle width direction, from this inward-bending portion 64. This extension member 60 is configured to deform and absorb an impact at a vehicle frontal collision, in cooperation with the above-described front side frame 18.

More specifically, as shown in FIGS. 7 and 12, the extension member 60 is joined to the pole portion 28 so that a center line CL1 of a longitudinal direction of the extension member 60 at the rear end portion is located at an inward position, in the vehicle width direction, relative to a center line CL2 of a standing-vertical direction of the tower portion 28. Accordingly, the tower portion 27 is twisted when the vehicle-frontal collision load is inputted, which causes the extension member 60 to bend inward, in the vehicle width direction, at its inward-bending portion 64 (i.e., its front portion which projects forward from its rear end portion, bending inward), not to get broken at its rear end portion (i.e., a root portion). Thus, twisting of the tower portion 27 surely causes inward-bending of the inward-bending portion 64 of the extension member 60 regardless of the collision manner.

In the present embodiment, as shown in FIGS. 4, 6, 7 and 12, the rear end portion of the extension member 60 has a cut-out portion 65 at an outward side, in the vehicle width direction, thereof and this cut-out portion 65 is made contact and welded to both the front side portion 28a and the inward-side portion 28b of the above-described portion having the U-shaped cross section of the pole portion 28 of the tower portion 27. Thus, the length of the welding line is made properly long, so that it is surely prevented that the extension member 60 gets broken at the rear end portion, and the above-described inward-bending of the extension member 60 is ensured.

Further, as shown in the plan view of FIG. 12, the closed cross section 63 of the extension member 60 is configured such that the size thereof is great at the rear end portion of the extension member 60, then becomes narrow toward the above-described inward-bending portion 64, and becomes great again at the portion which projects forward, bending outward. That is, the closed cross section 63 of the extension member 60 is configured such that the size thereof is the smallest at the inward-bending portion 64. Thus, the above-described inward-bending of the extension member 60 at the vehicle frontal collision is promoted.

Herein, the extension member 60 is configured such that the size thereof at the inward-bending portion 64 is narrow in the plan view, but the vertical width thereof is substantially the same over its whole length from its rear end to its front end as shown in the side view of FIGS. 1 and 5. Also, the extension member 60 is configured to extend substantially horizontally from its rear end to its front end at a position below the front side frame 18 as shown in FIG. 1.

As shown in FIGS. 1-4, a pair of set plates 66 are attached to respective front end portions of the above-described pair of right-and-left front side frames 18, and a connecting plate 67 extending in the vehicle width direction is provided to extend between respective front end portions of the pair of right-and-left extension members 60. A lower-end bending portion 66a of the set plate 66 and an upper-end bending portion 67a of the connecting plate 67 which corresponds to a front-end position of the extension member 60 are fixedly fastened to each other with a fastening member 68, such as bolt and nut. A sub crash can 70 is attached to the front end portion of the extension member 60 via the connecting plate 67 and a bracket 69. A main crash can, not illustrated, is attached to the front end portion of the front side frame 18 via the set plate 66 and a bracket. As shown in the side view of FIG. 1, respective front ends of the front side frame 18 and the extension member 60 are positioned so that both of them can start deforming concurrently after the main crash can (not illustrated) and the sub crash can have crushed at the vehicle frontal collision.

Herein, as shown in FIGS. 5, 9 and 11, three plate members 71, 72, 73 are fixed inside the pole portion 28 having the U-shaped cross section of the tower portion 27 of the sub frame 20. These plate members 71, 72, 73 are provided to extend between the front side portion 28a and the rear side portion 28c of the pole portion 28 as shown in FIG. 5. The plate member 71 is provided on the open side of the U-shaped cross section as shown in FIG. 11, and comprises a vertical wall portion 71a which extends vertically and upper-and-lower bending portions 71b, 71c which bend inward, in the vehicle width direction, from upper-and-lower ends of the vertical wall portion 71a. The plate members 71, 72, 73 can increase the rigidity of the pole portion 28.

The plate member 72 is provided inside the pole portion 28 at a position corresponding to the level of the rear end portion of the extension member 60, and comprises a vertical wall portion 72a which extends vertically and upper-and-lower wall portions 72b, 72c which bend inward from upper-and-lower ends of the vertical wall portion 72a. The upper-and-lower wall portions 72b, 72c are jointly welded to the inward-side portion 28b of the pole portion 28, so that a closed cross section 74 extending longitudinally is formed between the inward-side portion 28b and the plate member 72. The above-described vertical wall portion 72a is configured such that the vertical width of its rear end portion is wider than that of its front end portion, and the above-described lower wall portion 72c slants in such a manner that its front portion is located at a higher level than its rear portion, so that the input load from the extension member 60 at the vehicle frontal collision is transmitted rearward (see FIG. 5). The plate member 73 is provided at a bottom portion inside the pole portion 28 having the U-shaped cross section, and has a V-shaped groove 73a at its longitudinally-middle portion on the outward side.

Further, as shown in FIGS. 4, 5 and 12, there is provided a gusset member 75 which interconnects the rear side portion 28c of the pole portion 28 of the tower portion 27 and a portion of the upper-side member 24A of the side portion 24 of the sub frame 20 which is located right behind the split line PL. Herein, the gusset member 75 is configured such that an upper side of its front portion overlaps the plate member 72 in the vertical direction as shown in FIG. 4 and also overlaps the rear end portion of the extension member 60 in the vehicle width direction.

As shown in FIG. 5, the rear end portion of the extension member 60, the plate member 72 provided inside the pole portion 28, and the gusset member 75 provided behind the tower portion 27 are arranged in line obliquely rearward and downward so as to transmit the vehicle-frontal-collision load to the sub frame 20 properly through these members. Herein, in the figures, an arrow F shows a vehicle front direction, an arrow R shows a vehicle rear direction, an arrow IN shows a vehicle inward direction, an arrow OUT shows a vehicle outward direction, and an arrow UP shows a vehicle upward direction.

The embodiment shown in the figures are configured described above, and the operations of the present embodiment will be described. The front side frame 18 and the extension member 60 start deforming concurrently after the main crash can (not illustrated) and the sub crash can 70 which are provided at the respective front ends of these members 18, 60 have crushed at the vehicle frontal collision, so that these members 18, 60 jointly deform and absorb the impact of the collision.

Figure 15:
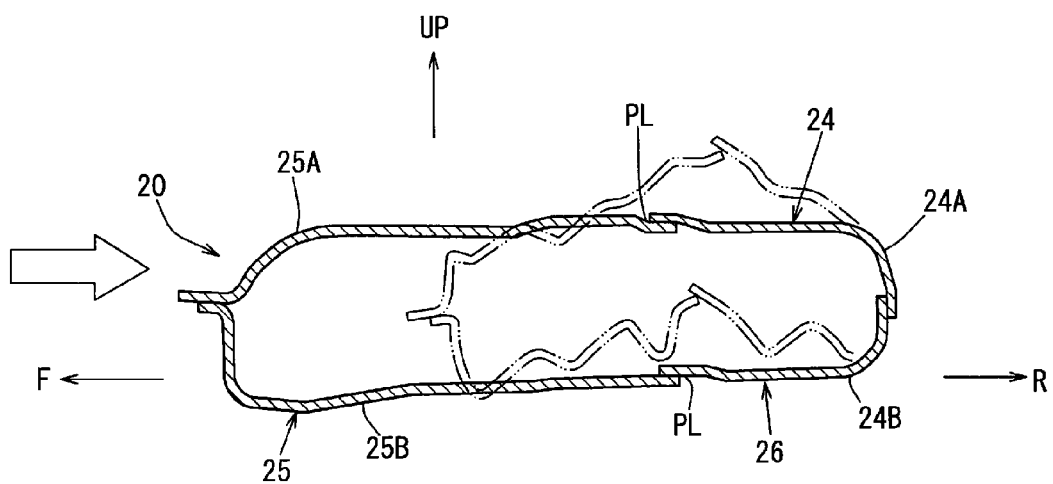
FIG. 15 is an explanatory diagram showing a deformation state of a sub frame at a vehicle frontal collision.
Figure 16:
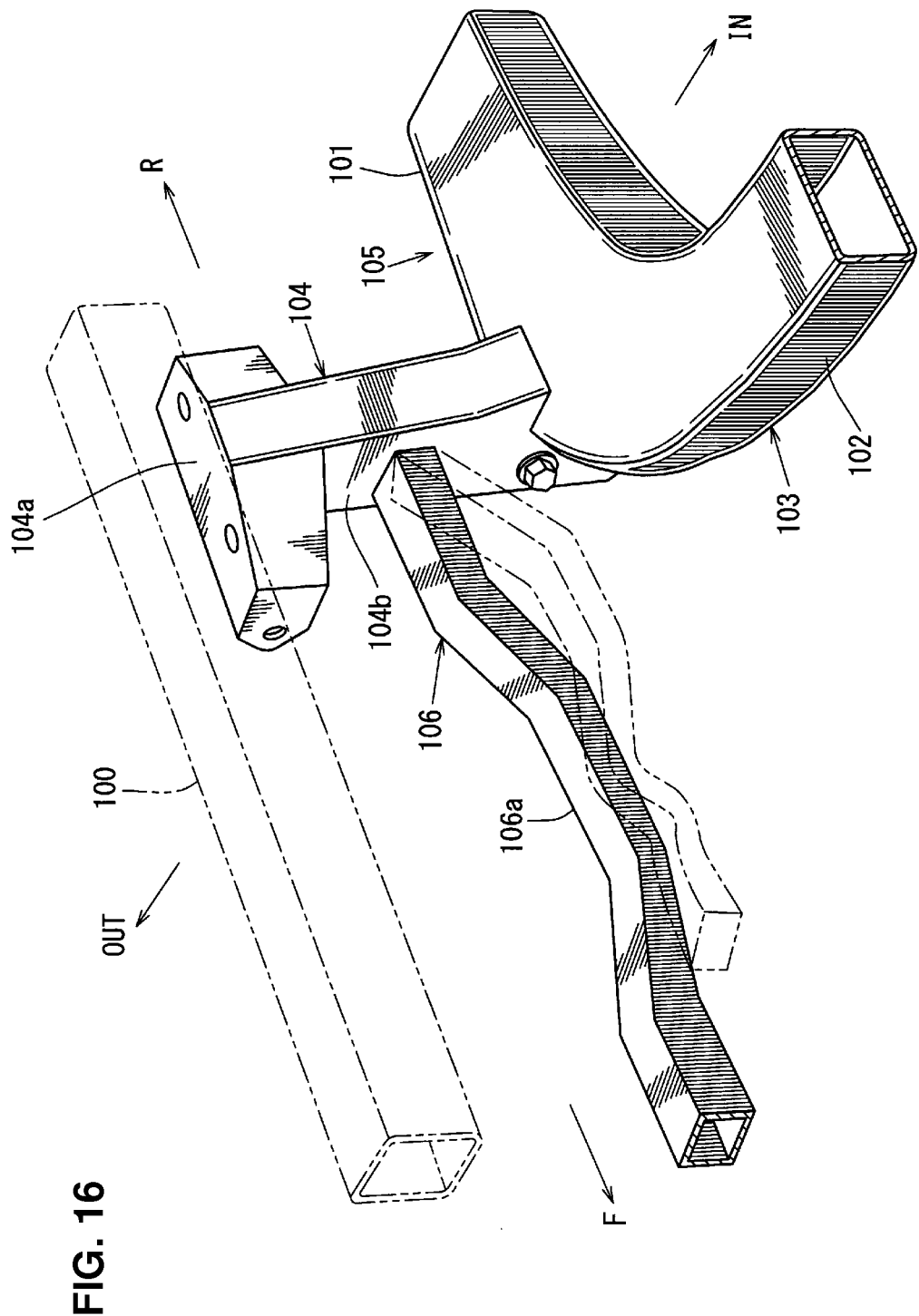
FIG. 16 is a perspective view showing a comparative example of the vehicle-body front structure.

In this case, the connecting of the extension member 60 is configured such that the center line CL1 of the longitudinal direction of the extension member 60 at the rear end portion is located at the inward position, in the vehicle width direction, relative to the center line CL2 of the standing-vertical direction of the tower portion 27 as shown in FIG. 12, and the cut-out portion 65 is made contact and welded to both the front-side portion 28a and the inward-side portion 28b of the pole portion 28 of the tower portion 27. Accordingly, the tower portion 27 is twisted when the vehicle-frontal collision load is inputted, which causes the extension member 60 to bend inward, in the vehicle width direction, at its inward-bending portion 64, not to get broken at its rear end portion or not to be apart at its welding portion. Thus, the inward-bending of the extension member 60 is ensured regardless of the collision manner, thereby absorbing the collision impact. Moreover, the split line PL of the side portion 24 and the front side portion 25 of the sub frame 20 matches the position of the attachment portion 22 of the lower arm 21 as shown in FIGS. 5 and 12. Accordingly, the sub frame 20 is surely made crush in such a manner the split line PL moves upward as shown by imaginary lines in FIG. 15 from its normal state shown by solid lines so as to absorb the collision impact.

As described above, the vehicle-body front structure of the present embodiment comprises the front side frames 18 which extend in the vehicle longitudinal direction at the right and left sides of the engine room 1, projecting forward from the vehicle-compartment portion (see the dash lower panel 3), and the sub frame 20 which is provided at the bottom portion of the engine room 1 and comprises the body portion 26, which is comprised of the right-and-left side portions (see the side portions 24) constituting the attachment portions 22, 23 of the lower arms of the front-wheel suspension and the front side portion 25 interconnecting the right-and-left side portions (the side portions 24) in the vehicle width direction, and the right-and-left tower portions 27 which are provided to stand substantially vertically at the right and left sides of the body portion 26. Herein, the tower portions 27 are fastened to the respective lower face portions of the front side frames 18 at the respective upper end portions, and the right-and-left side portions (the side portions 24) of the body portion 26 are fastened to the bottom portion forward of the vehicle-compartment portion (see the sub-frame attaching pedestal 10) at the respective rear portions. The vehicle-body front structure of the present embodiment further comprises the right-and-left extension members 60 operative to deform and absorb the impact at the vehicle frontal collision, in cooperation with the front side frames 18. Herein, the extension members 60 are configured to be joined to the respective middle portions, in the height direction, of the tower portions 27 of the sub frame 20 at the respective rear end portions, to project forward, bending outward, in the vehicle width direction, at the level below the front side frames 18, and to be comprised of a pair of members having the closed cross section 63, respectively, and the respective rear end portions of the extension members 63 are positioned so that the center line CL1 of the longitudinal direction of each of the extension members 60 at the rear end portion is located at the inward, position relative to the center line CL2 of the standing-vertical direction of each of the tower portions 27 (see FIGS. 1, 6 and 12).

According to the above-described vehicle-body front structure, since the rear end portion of the extension member 60 is joined to the middle portion, in the height direction, of the tower portion 27 of the sub frame 20 and the extension member 60 projects forward, bending outward, in the vehicle width direction, at the level below the front side frame 18, the front side frame 18 and the extension member 60 can jointly deform and absorb the impact at the vehicle frontal collision.

Further, since the center line CL1 of the longitudinal direction of the extension member 60 at the rear end portion is located at the inward position, in the vehicle width direction, relative to the center line CL2 of the standing-vertical direction of the tower portion 27, the tower portion 27 is twisted when the vehicle-frontal collision load is inputted, which causes the extension member 60 to bend inward, in the vehicle width direction, at its front portion which projects forward from its rear end portion (see the inward-bending portion 64), not to get broken at its rear end portion (i.e., the root portion). That is, twisting of the tower portion 27 can surely cause the inward-bending of the front portion (see the inward-bending portion 64) of the extension member 60 regardless of the collision manner.

Further, according to the present embodiment, the tower portion 27 has the portion having the U-shaped cross section which opens outward, in the vehicle width direction, which is provided for storing the lower-arm pivot 21F, and the rear end portion of the extension member 60 has the cut-out portion 65 at an outward side, in the vehicle width direction, thereof and the connecting of the rear end portion of the extension member 60 to the tower portion 27 is configured such that the cut-out portion 65 of the extension member 60 is made contact and welded to both the front-side portion 28a and the inward-side portion 28b of the portion having the U-shaped cross section of the tower portion 27 (see FIGS. 6 and 12).

Thereby, since that the cut-out portion 65 of the extension member 60 is made contact and welded to both the front-side portion 28a and the inward-side portion 28b of the tower portion 27, the length of the welding line can be properly long, so that it can be surely prevented that the extension member 60 gets broken at the rear end portion, thereby ensuring the above-described inward-bending of the extension member 60.

Moreover, according to the present embodiment, the stabilizer-support pedestal 51 is provided forward of the upper end portion of the tower portion 27 at the level which overlaps the extension member 60, and the extension member 60 is configured such that the center line thereof extends forward from the rear end portion, curving inward, in the vehicle width direction, once so as to avoid the stabilizer-support pedestal 51 and then curving outward, in the vehicle width direction (see FIGS. 6 and 9).

Thereby, the stabilizer 50 and the extension member 60 can be properly arranged together, and the above-described effect of the inward-bending of the extension member 60 can be enhanced.

Additionally, according to the present embodiment, the closed cross section 63 of the extension member 60 is configured such that the size thereof is great at the rear end portion of the extension member 60 and becomes narrow toward the inward-bending portion 64 (see FIGS. 6 and 12).

Thereby, since the closed cross section 63 of the extension member 60 is configured such that the size thereof is great at the rear end portion of the extension member 60 and becomes narrow toward the inward-bending portion 64, the above-described inward-bending of the extension member 60 at the vehicle frontal collision can be promoted.

The vehicle-compartment portion of the present invention corresponds to the dash lower panel 3 of the present embodiment. Likewise, the right-and-left side portions of the sub frame correspond to the side portions 24, and the bottom portion forward of the vehicle-compartment portion corresponds to the sub-frame attaching pedestal 10.

The present invention should not be limited to the above-described embodiment, and any other modifications or improvements may be applied within the scope of the claimed invention.

What is claimed is:
1. A vehicle-body front structure, comprising:
a pair of right-and-left front side frames extending in a vehicle longitudinal direction at right and left sides of an engine room, projecting forward from a vehicle-compartment portion;
a sub frame provided at a bottom portion of the engine room, the sub frame comprising a body portion which is comprised of right-and-left side portions and a front side portion and a pair of right-and-left tower portions, the right-and-left side portions constituting right-and-left attachment portions of right-and-left lower arms of a front-wheel suspension, the front side portion interconnecting the right-and-left side portions in a vehicle width direction, the pair of tower portions of the sub frame being provided to stand substantially vertically at right and left sides of the body portion and fastened to respective lower face portions of the pair of front side frames at respective upper end portions thereof, the right-and-left side portions of the body portion of the sub frame being fastened to a bottom portion forward of the vehicle-compartment portion at respective rear portions thereof; and a pair of right-and-left extension members operative to deform and absorb an impact at a vehicle frontal collision, in cooperation with the pair of front side frames, wherein said pair of extension members are configured to be joined to respective middle portions, in a height direction, of the pair of tower portions of said sub frame at respective rear end portions thereof, to project forward, bending outward, in the vehicle width direction, at a level below said pair of front side frames, and to be comprised of a pair of members having a closed cross section, respectively, and said respective rear end portions of the pair of extension members joined to the pair of tower portions of the sub frame are positioned so that a center line of a longitudinal direction of each of the pair of extension members at the rear end portion is located at an inward position, in the vehicle width direction, relative to a center line of a standing-vertical direction of each of said pair of tower portions of the sub frame.

2. The vehicle-body front structure of claim 1, wherein each of said tower portions of the sub frame has a portion having a U-shaped cross section which opens outward, in the vehicle width direction, which is provided for storing a pivot of each of the lower arms, and the rear end portion of each of said extension members has a cut-out portion at an outward side, in the vehicle width direction, thereof and connecting of the rear end portion of each of the extension members to each of the tower portions is configured such that said cut-out portion of the extension member is welded to both a front-side portion and an inward-side portion of said portion having the U-shaped cross section of the tower portion.

3. The vehicle-body front structure of claim 1, wherein a pedestal for supporting a stabilizer is provided forward of the upper end portion of each of said tower portions at a level which overlaps each of said extension members, and each of the extension members is configured such that a center line thereof extends forward from the rear end portion, curving inward, in the vehicle width direction, once so as to avoid said pedestal for supporting the stabilizer and then curving outward, in the vehicle width direction.

4. The vehicle-body front structure of claim 2, wherein a pedestal for supporting a stabilizer is provided forward of the upper end portion of each of said tower at a level which overlaps each of said extension members, and each of the extension members is configured such that a center line thereof extends forward from the rear end portion, curving inward, in the vehicle width direction, once so as to avoid said pedestal for supporting the stabilizer and then curving outward, in the vehicle width direction.

5. The vehicle-body front structure of claim 3, wherein the closed cross section of each of said extension members is configured such that the size thereof is great at the rear end portion of each of the extension members and becomes narrow toward said portion thereof which curves inward so as to avoid the pedestal for supporting the stabilizer.

6. The vehicle-body front structure of claim 4, wherein the closed cross section of each of said extension members is configured such that the size thereof is great at the rear end portion of the each of extension members and becomes narrow toward said portion thereof which curves inward so as to avoid the pedestal for supporting the stabilizer.

* * * * *